United States Patent [19]

Eller

[11] Patent Number: 5,183,579
[45] Date of Patent: * Feb. 2, 1993

[54] METHOD, SYSTEM AND APPARATUS FOR HANDLING SUBSTANCES ON OR IN WATER

[76] Inventor: J. David Eller, P.O. Drawer "E", 33 NW. 2nd St., Deerfield Beach, Fla. 33441

[*] Notice: The portion of the term of this patent subsequent to Sep. 3, 2008 has been disclaimed.

[21] Appl. No.: 660,938

[22] Filed: Feb. 26, 1991

Related U.S. Application Data

[63] Continuation-in-part of Ser. No. 485,625, Feb. 27, 1990, Pat. No. 5,045,216.

[51] Int. Cl.⁵ .............................................. E02B 15/04
[52] U.S. Cl. ................................. 210/776; 210/242.3; 210/923
[58] Field of Search ..................... 210/242.3, 776, 923; 114/270; 440/39

[56] References Cited

U.S. PATENT DOCUMENTS

| | | | |
|---|---|---|---|
| 61,880 | 2/1867 | Serrell | 210/242.3 |
| 1,943,152 | 1/1934 | Weiss | 440/39 |
| 2,891,672 | 6/1959 | Veld et al. | 210/923 |
| 3,139,060 | 6/1964 | Dane | 440/39 |
| 3,219,190 | 11/1965 | Thune | 114/147 |
| 3,251,330 | 5/1966 | Honegger | 210/242.3 |
| 3,529,720 | 9/1970 | Chablaix | 210/776 |
| 3,547,553 | 12/1970 | Stanfield | 210/242.3 |
| 3,618,768 | 11/1971 | Brown | 210/776 |
| 3,659,713 | 5/1972 | Mueller | 210/776 |
| 3,660,098 | 5/1972 | Garland et al. | 210/776 |
| 3,684,095 | 8/1972 | Ayers | 210/242.3 |
| 3,688,506 | 9/1972 | Marcocchio | 210/242.3 |
| 3,693,801 | 9/1972 | Pogonowski | 210/242.3 |
| 3,722,687 | 3/1973 | Stebbins et al. | 210/210 |
| 3,722,688 | 3/1973 | Wirsching | 210/776 |
| 3,730,346 | 5/1973 | Prewitt | 210/242.3 |
| 3,762,169 | 10/1973 | Graham | 210/242.3 |
| 3,771,662 | 11/1973 | Muramatsu et al. | 210/923 |
| 3,823,828 | 7/1974 | Derzhavets et al. | 210/242.3 |
| 3,830,370 | 8/1974 | Glaeser et al. | 210/242.3 |
| 3,836,004 | 9/1974 | Favret | 210/776 |
| 3,844,944 | 10/1974 | Mercuri | 210/242.3 |
| 3,847,816 | 11/1974 | DiPerna | 210/242.3 |
| 3,907,463 | 9/1975 | Eller et al. | 417/360 |
| 3,970,556 | 7/1976 | Gore | 210/776 |
| 4,031,707 | 6/1977 | Ross et al. | 210/242.3 |
| 4,033,869 | 7/1977 | McGrew | 210/242.3 |
| 4,046,691 | 9/1977 | Irons | 210/242.3 |
| 4,116,833 | 9/1978 | Stagemeyer | 210/776 |
| 4,128,068 | 12/1978 | Ogura et al. | 210/242.3 |
| 4,133,766 | 1/1979 | Stupica | 210/242.3 |
| 4,139,470 | 2/1979 | Stagemeyer | 210/170 |
| 4,142,972 | 3/1979 | Nebeker et al. | 210/242.3 |
| 4,146,477 | 3/1979 | Challener | 210/143 |
| 4,182,679 | 1/1980 | Van Hekle | 210/923 |
| 4,208,978 | 6/1980 | Eller | 114/151 |
| 4,209,400 | 6/1980 | Mayes | 210/776 |
| 4,223,625 | 9/1980 | Puretic | 114/147 |
| 4,264,444 | 4/1981 | Bronnec | 210/242.3 |
| 4,310,415 | 1/1982 | Webb | 210/242.3 |
| 4,350,476 | 9/1982 | Eller | 417/304 |
| 4,356,086 | 10/1982 | Oberg | 210/242.3 |
| 4,388,188 | 6/1983 | Morris | 210/242.3 |
| 4,510,054 | 4/1985 | Wylie | 210/242.3 |
| 4,669,972 | 6/1987 | Koblanski | 210/923 |
| 4,818,399 | 4/1989 | Midkiff | 210/242.3 |
| 4,851,133 | 7/1989 | Rymal | 210/242.3 |
| 4,882,073 | 11/1989 | Griffith | 210/776 |
| 5,045,216 | 9/1991 | Eller | 210/923 |

FOREIGN PATENT DOCUMENTS

0005411A1 11/1979 European Pat. Off.
7723546 3/1979 France.

Primary Examiner—Stanley S. Silverman
Assistant Examiner—Christopher Upton
Attorney, Agent, or Firm—Vorys, Sater, Seymour & Pease

[57] ABSTRACT

There are disclosed a method of and system including a ship for recovery of oil from an oil spill. The system includes a main ocean-going ship having a floating intake device with large submersible pumps; a clarifier system in the ship for separating the oil from the water; a discharge system for discharging the separated water; a bow thurster for laterally positioning the bow; a plurality of other vessels using floatable oil recovery booms for containing the spill and urging it toward the oil recovery ship, and pumps for pumping the processed oil back to shore or to another ship. A plurality of secondary and smaller vessels each having pumping means associated therewith which are operable for directing either a surface current or a current in the water for displacing objects and substances on or in water. The smaller vessels can use booms to contain the spill and can have their pumping means operated so as to create controlled currents in preselected directions so as to protect areas such as shorelines and the like.

17 Claims, 11 Drawing Sheets

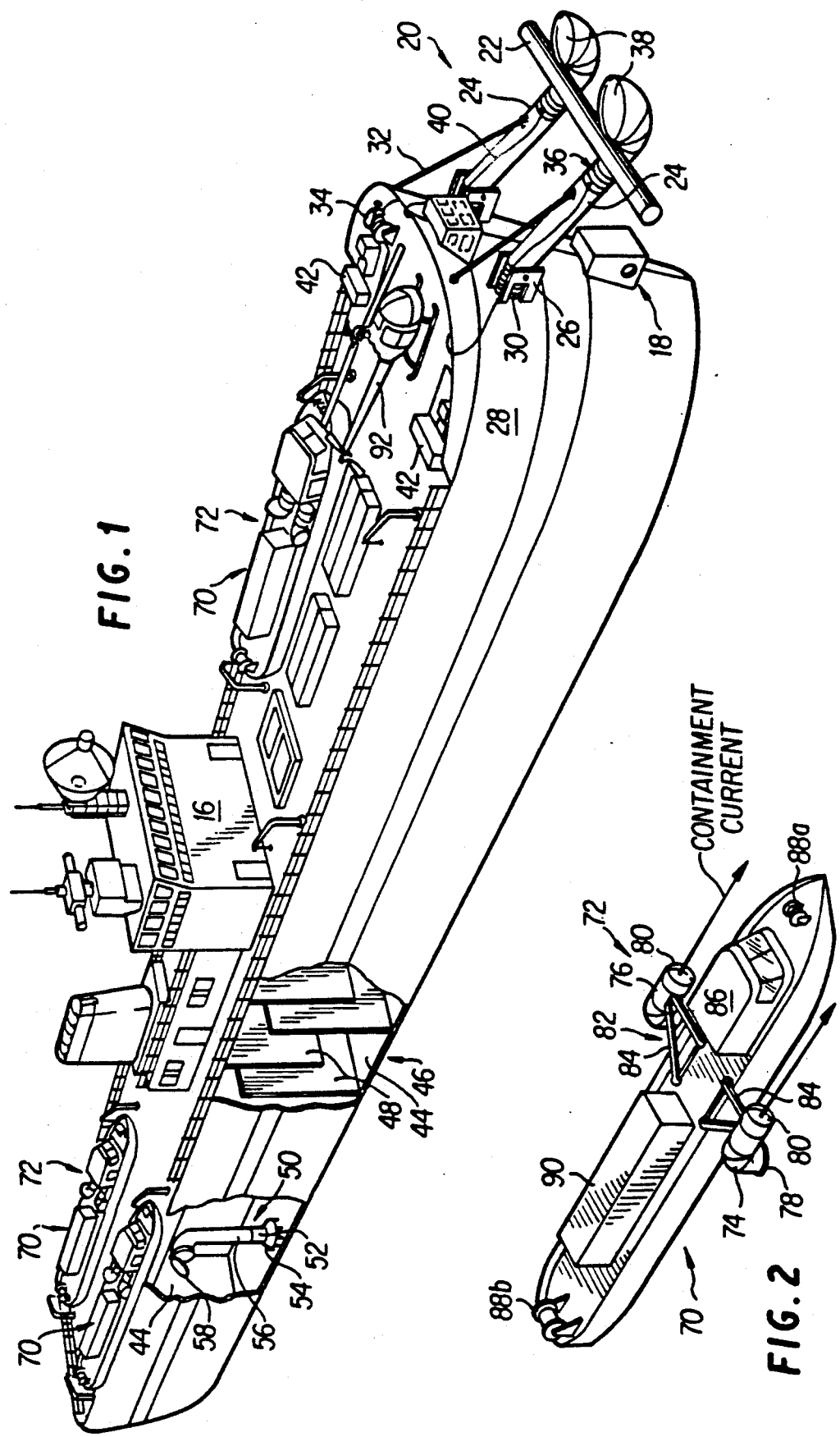

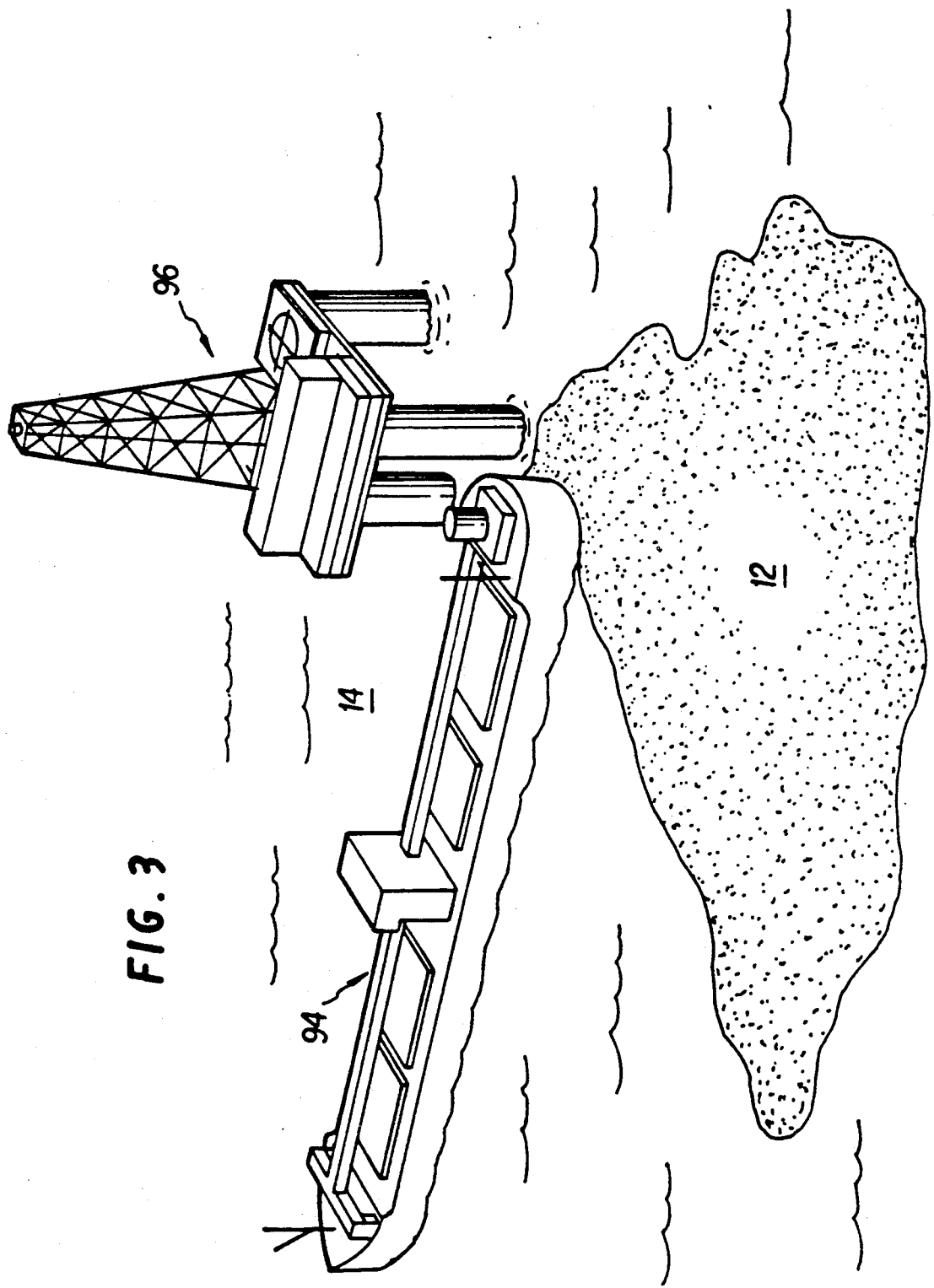

METHOD, SYSTEM AND APPARATUS FOR HANDLING SUBSTANCES ON OR IN WATER

CROSS REFERENCE TO RELATED APPLICATIONS

The present invention is a continuation-in-part application for applicant's copending patent application 7/485,625, filed Feb. 27, 1990, now U.S. Pat. No. 5,045,216 and is related to applicant's copending application Ser. No. 07/431,395 which was filed on Nov. 3, 1989, now U.S. Pat. No. 5,015,399.

BACKGROUND OF THE INVENTION

The present invention is directed toward a method, system, and vessel for use in controlling and displacing objects and substances on or in water, such as for oil spill control and contaminant control purposes.

With the larger oil tankers of today great quantities of thick black crude oil can be released into the water should the oil tanker experience an accident. Moreover, off-shore drilling platforms sometime malfunction and this may result in the loss of oil. Accordingly, up to several million gallons of crude oil can spread over the water. Currents can carry the contaminating oil out to sea and to hundreds of miles of coastline. Oil spills can produce devastating damage to coastlines, fisheries and kill tens of thousands of animals.

Oil is not easy to clean up as can be evidenced by recent disasters. Moreover, it is important to start cleaning up a spill immediately before the oil has a chance to spread.

There have been numerous proposals to recover oil from a spill on the water. One approach is to use chemical dispersents which break down the oil into tiny pieces. However, there is a body of evidence to suggest that such dispersents may harm ocean life. Other approaches include using booms which are floating sausage-like members with skirts that hang a few feet below the surface. They can be towed by ships to corral the pancake-like floating oil. Subsequently, skimmer devices then collect the oil by sucking or scooping it up.

Exemplary of other known prior art approaches include those described in the following U.S. Pat. Nos.: 3,251,330; 3,688,506; 3,684,095; 4,182,679; 3,693,801; 4,209,400; 3,730,346; 3,771,662; 4,223,625; 3,844,944; 4,356,086; 3,847,816; 4,146,477; 4,388,188; 4,116,833; 4,818,399; 3,722,688; 3,847,816; 4,139,470; 4,142,972; 4,356,086; 3,836,004; 4,388,188; 4,510,054 4,133,765; 4,669,972 and 3,970,556. As noted, an oil spill is subject to currents and sometimes the oil will move toward the open ocean which makes its recovery by known skimmer devices difficult because of wave action, particularly with rolling seas. In situations where there are several million gallons of spilled oil, the heretofore known devices used are inadequate. Unfortunately, present human efforts will generally get rid of about 10 percent of the oil from an oil spill.

A significant improvement over the prior art approaches is described in applicant's above noted patent application. Basically, these approaches disclose an improved method of and system including a surface vessel for expeditiously removing floating contaminant from the surface of a body of water. Accordingly, there is provided an improved arrangement whereby the contaminant collecting device is maintained in the skimming position of the intake during ship movement despite rolling seas. By virtue of the large capacity pumps utilized in the suction system vast quantities of oil/water are pumped to a separation reservoir within the body of the ship. As a result large quantities of oil may be rapidly and efficiently separated. Despite the significant advantages offered by the above noted invention, there is, nevertheless, a continuing desire to improve thereupon.

It is also desired to displace or clear the bottom of various bodies of water, such as channels and the like. Typically, this is done with mechanical dredging implements including hydraulic pumps which dredge material, such as sand-and-gravel for land-reclamation work. The usual type of hydraulic dredge has a digging ladder suspended from a bow of the vessel at an angle of 45° for a maximum digging depth. The ladder carries a suction pipe and cutter with its driving machinery. The material excavated by the cutter enters the mouth of the suction pipe and the material is sucked up by a suction pump and discharged towards the shoreline. In some situations several pumps are placed in series to effectuate the dredging operation. It will be appreciated that the foregoing technique is rather complicated and expensive to set up and operate. Moreover, known operating procedures, such as described, for clearing and maintaining channels are time consuming to set up and operate. Thus, there is a continuing desire to improve upon known approaches for clearing and maintaining channels and the like. Moreover, there is no known method, system or apparatus useful for providing not only oil spill control, but effective for clearing bodies of water of objects and substances.

SUMMARY OF INVENTION

Accordingly, it is an object of this invention to provide for an improved method, system and apparatus for displacing objects and substances in at least one preferred direction on and in water through the application of at least a controlled current.

It is another object of the present invention to provide for an oil recovery method and system including a main vessel and several smaller vessels wherein oil spills may be easily and quickly contained and recovered.

In this latter regard, there is a system for recovering floating contaminant from the surface of a body of water. The system comprises a main surface vessel propellable on a body of water and includes a reservoir for receiving a contaminant/water mixture thereinto, and separation means operatively associated with the reservoir for separating the contaminant from the water. Provision is made for floatable water/contaminant collecting means connected to and movable with the main vessel and includes intake means being automatically maintainable in a position for allowing intake of a water/contaminant mixture thereinto and submersible pumping means associated with the intake means and being operable for pumping the water/contaminant mixture to the reservoir. Provision is made for discharge means being operable for at least pumping the separated water from the reservoir.

A plurality of secondary, self-propellable surface vessels are provided. Each of the secondary vessels includes submersible pumping means including an intake assembly and an outlet assembly connected to and movable with the secondary vessel. The pumping means is operable for pumping the water/contaminant mixture into the intake assembly and out from the outlet assembly to create a contained current of the water/- contaminant mixture in a direction which is controlled by the position of the outlet assembly.

In an illustrated embodiment, smaller self-propellable vessels are positionable to drive the contaminant/water mixture to the intake assembly of the main vessel and are carriable and off-loadable from the main vessel.

In another illustrated embodiment, provision is made for interposing the smaller self-propellable vessels between the shoreline and a spill front so as to push or sweep the oil from the shore and toward the main vessel. The smaller vessels are anchored between the shore line and the spill and serve to effectively sweep the spill toward the larger vessel.

In another illustrated embodiment, provision is made for a string of floatable oil contaminant booms which are connected to at least a pair of the secondary vessels so as to contain the spill as well as urge it toward the main vessel.

In another illustrated embodiment, provision is made for a helicopter having sensing means for sensing the thickest parts of a slick so that the secondary vessels can direct their efforts to such locations.

The present invention also contemplates a method of removing contaminant material from the surface of a body of water. The method includes the step of providing a main contaminant recovery vessel propellable along a body of water and having a reservoir; the step of positioning a contaminant collecting device forwardly of the vessel for skimming through the surface contaminant as the vessel moves; the step of providing the collecting device with intake means that extend from the vessel to the surface and which has an intake opening formed at a distal end thereof with at least a submersible pumping device positioned therein; the step of maintaining skimming positioning of the intake means despite wave motion; the step of pumping the water/contaminant mixture to the reservoir by the submersible pumping device; the step of separating the contaminant from the water; the step of discharging at least the separated water from the reservoir so as to provide for a generally continuous separating process; the step of providing a plurality of smaller secondary and self-propellable vessels which have water/contaminant pumping means associated therewith; and, the step of operating the pumping means of the secondary vessels so as to generate a desired surface flow of contaminant/water mixture toward the collecting device of the main vessel.

In another illustrated embodiment, there is a method of controlling floating contaminant comprising the step of providing at least one self-propellable surface vessel having at least one submersible pumping means associated therewith; and, the step of operating the pumping means to generate a reverse surface flow of the mixture so as to urge the mixture in a desired direction.

According to this invention, there is provided a self-propellable vessel for use in directing a contained current of a water/contaminant mixture comprising the vessel includes a vessel body and pumping means connected to the vessel body. The pumping means have water/contaminant intake and outlet means and a submersible pump which is operable to create a contained current of the mixture in a preselected direction.

In an illustrated embodiment, the vessels of the last-noted means has the intake means and the pump submerged and the outlet means above the water surface. Also, the pumping means include mounting means for mounting the pump means exteriorly of the vessel body for movement between operative and inoperative positions.

In an illustrated embodiment, there is provided a vessel for use in directing a stream or current of water so as to displace objects or substances on or in the water in at least one generally preferred direction. Included is a vessel body and pumping means couplable to the vessel body. The pumping means is operable for pumping water from a body of water, in which the vessel is located, in sufficient force in at least one preferred direction for discharging a current of water so as to displace the objects and/or substances. The pumping means includes intake means for allowing intake of the water and outlet means operable for discharging the pumped intake water in the preferred direction with the preferred predetermined force.

In another preferred embodiment, the vessel is self-propellable and the pump is a submersible pumping means.

In another illustrated embodiment, the pump outlet means is angularly adjusted so as to direct the current in preferred directions, whereby the current, in one direction, is useful for controlling surface contaminants, such as oil, or in another direction for displacing substances and objects in a body of water so as to clear or maintain a channel or the like.

Among the other objects and features of the present invention are the provision of an improved contaminant recovery system for use in removing contaminant from the surface of a body of water; the provision of an improved system of the foregoing type which includes a main ship which utilizes submersible pumps for withdrawing large quantities of fluid and contaminant into a reservoir aboard a vessel and a plurality of smaller vessels, each equipped with submersible pumps; the provision of an improved system of the foregoing type in which the submersible pumps on the smaller vessels arranged are to provide controlled currents of the contaminant so as to direct the contaminant toward the main vessel; the provision of an improved system of the foregoing type in which the smaller vessels are interposed between the shoreline and an advancing front of the spill; the provision of an improved system in which the smaller vessels use floating booms for surrounding, collecting and urging the surface contaminant toward the main vessel; the provision of an improved system of the foregoing type which utilizes a helicopter with sensors that detect the thickest parts of the slick; the provision of improved smaller vessels for use in achieving the foregoing; the provisions of a method, system and apparatus for displacing objects and/or substances on or in a body of water in at least a preferred direction through the application of a current of water travelling in the preferred direction; the provisions of an improved method, system and apparatus carrying pumping means having an outlet means angularly displaceable to different positions so as to displace objects and substances on the water's surface and to displace objects and substances in the water; and the provisions of an improved method, system and apparatus of the last noted type for laterally displacing the vessel and thereby sweepingly displacing the objects and substances.

Still other objects and further scope of applicability of the present invention will become apparent from the detailed description to follow when taken in conjunction with the accompanying drawings in which like

BRIEF DESCRIPTION OF THE DRAWINGS

FIG. 1 is a perspective view of one preferred embodiment of the present invention, partly in section, showing details of the invention;

FIG. 2 is a perspective view showing of a smaller vessel of the present invention;

FIG. 3 is a perspective view of the scene of an accident resulting in an oil spill;

DETAILED DESCRIPTION

Figure 4:
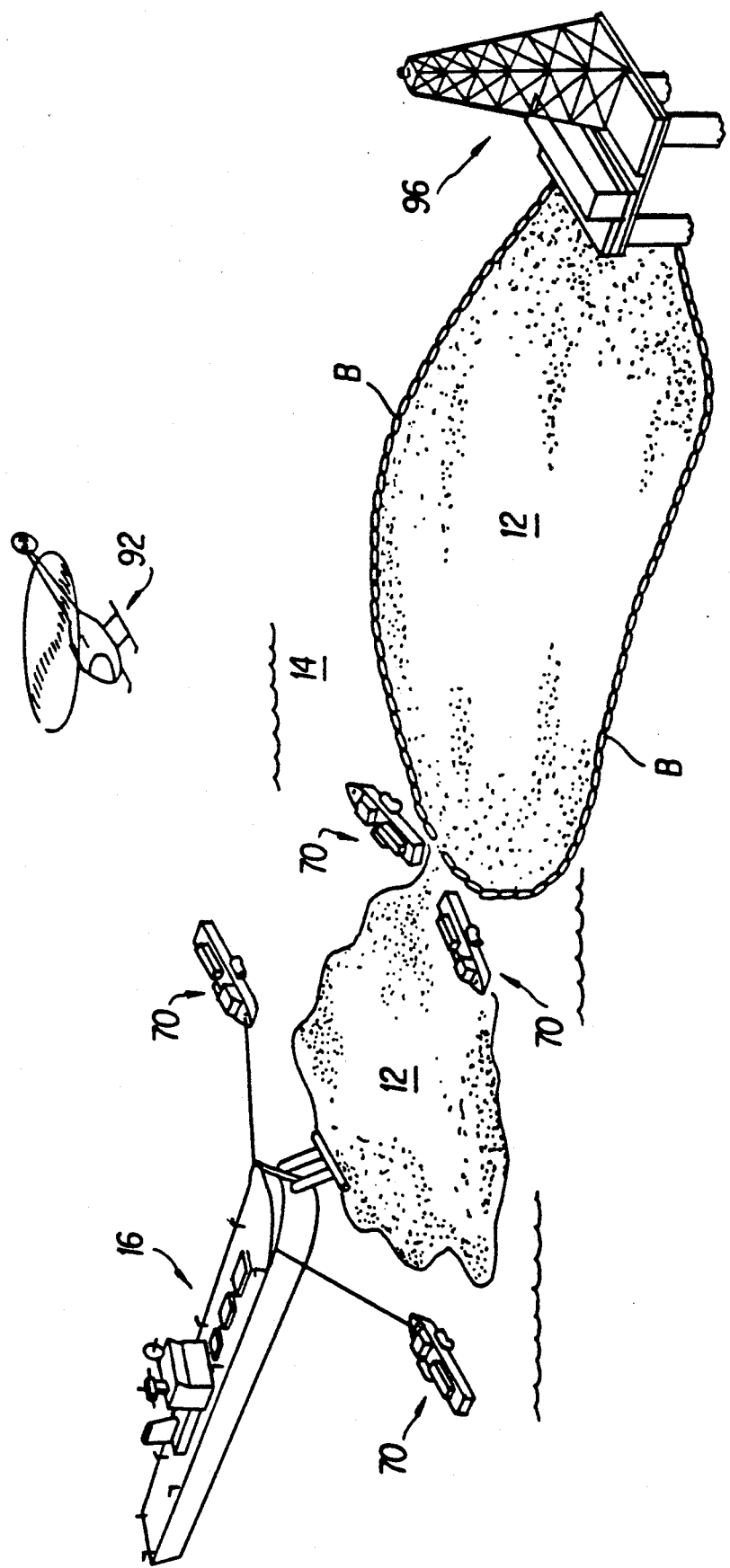
FIG. 4 is a perspective view illustrating one step of a spill recovery operation of the present invention.

Reference is made to FIGS. 1-9 for illustrating an improved system 10 for recovering a spill of surface contaminants, such as crude oil 12 from the surface of a body of water 14. Included in the system 10 is a self-propelled surface vessel, such as an ocean-going ship 16. Although a self-propelled ship is shown in this embodiment, it will be appreciated that a barge or the like may be used in the recovery process to be described. Only those details of the ship 16 necessary for understanding this invention will be discussed. A more complete description of the ship 16 is made in copending patent application U.S. Ser. No. 07/431,395 filed Nov. 3, 1989 which description is incorporated herein by reference. Connected to the bow of the ship is a portable bow thruster 18 of the type described in U.S. Pat. No. 4,208,978 and its description is incorporated herein by reference. The bow thruster 18 is essentially operable for purposes of laterally positioning the bow of the ship 16 in a manner which will facilitate maneuverability relative to the spill and oil lines coupled to the ship. The bow thruster 18 is retractable to a position above the water line when not in use. In use, the bow thruster is placed in the water and is operated so that water can be selectively thrust from opposite ends to shift the bow in the opposite direction of the thrusts.

Forwardly of the bow, there is provided a floatable oil/water collecting means or assembly 20. The floatable collecting assembly 20 includes an elongated floating means or cylindrical pontoon 22 that is connected to a pair of rigid and corrosion-resistant oil/water intake pipes 24 extending forwardly from the bow. The pontoon 22 can have, for example, a 60 inch diameter and be connected to the intake pipes 24 by reason of known flexible connectors (not shown). Each of the inward ends of the intake pipes 24 is pivotally mounted to a corresponding mounting bracket 26 attached to the ship's bulwark 28 for allowing the pipes to move in vertical planes for reasons which will be discussed. The pivotal intake pipes 24 are fluidly coupled to suitable inboard fluid conduits (not shown) by flexible bellows-type coupling members 30. The pivotal and flexible connection of the intake pipes 24 allows the collecting assembly 20 to continue floating and efficiently removing oil from the surface while the ship is moving despite wave action, especially rolling seas. Consequently, the intake pipes 24 will be automatically raised and lowered in response to wave action and also to settling of the ship owing to the large volumes of oil/water taken into the ship during the separation process. A cable 32 is attached to each intake pipe 24 and can raise and lower them due to the operation of a cable winch 34 so that, for example, the entire collecting assembly can be elevated out of the water.

Disposed within each of the intake pipes 24 in a known manner, is a submersible, variable volume water pump unit, indicated generally by reference numeral 36. The pump is described in U.S. Pat. No. 3,907,463 and its description is incorporated herein by reference. The pumps 36 are patented and obtainable from the M&W Pump Corporation, and are identified as the Model HMF 60 Water Pump. The submersible pumps 36 shown are a mixed flow type, but can also be an axial flow pump which can be mounted in the intake pipe 24 in a known manner. The output of each pump can be varied and can pump upwards of about 125,000 gpm of the oil/water mixture into the ship 16. Each of the pumps 36 has an inverted intake bell 38 which is attached to the free end of the intake pipe 24. The intake bells 38 are supported by the pontoon 22 so as to allow the former to skim vast volumes of the oil/water mixture from the surface of the water. The intake bells 38 can be located slightly below the oil spill 12. Each of the water pumps 36 is operable through hydraulic lines 40 from a drive unit 42 mounted onboard the ship 16. The drive units 42 of the pumps 36 are described in U.S. Pat. No. 4,350,476 which is herein incorporated by reference. The drive unit 42 is a patented product of the M&W Pump Corporation and is identified as the Model 6000D Drive Unit. It will be appreciated that the vertical positioning of the intake bells 38 will vary depending upon sea conditions as well as loading factors of the ship. The skimming position is maintainable automatically because of the floating collecting assembly 20. Since the intake bells 38 are below the oil spill 12 and the pumping capacities are so large, a hydraulic gradient is created which is sufficient to cause the flow into the intake pipes as the ship 14 moves and thereby avoids the oil/water from being pushed from the ship.

Referring back to the ship 16, it includes an extremely large hold or reservoir 44 which extends a substantial amount of the length of the ship. The reservoir 44 must have a large storage volume inasmuch as the pumps 36 can each pump large variable capacities up to 125,000 gpm into the ship. Mounted in the reservoir 44 is a clarification system 46 including a plurality of oil separating plates 48 which are suitably secured to a hold formed by the ship's bulwark. The separation plates 48 are spaced apart in a linear fashion and are vertically staggered relative to each other as shown. The foregoing arrangement serves to separate the water from the crude oil and the separated oil is stored downstream of the plates 48 in the reservoir 44. The present invention contemplates other oil/water separating approaches including a centrifuge type device.

Also according to this invention it is important that there be provided a processed water discharge means or assembly 50 so that the weight of the ship with the pumped water during the recovery process does not overload the ship. Since it is desired to allow the ship 16 to recover the oil as quickly and continuously as possible, the present embodiment utilizes a pair of large variable volume submersible pumps 52 (one of which is shown). These pumps are similar and equal in capacity to the pumps 36 described in connection with the collecting assembly 20. Accordingly, the processed water can be discharged at the same rate it is pumped into the ship. The pumps 52 are vertically oriented so that their intake ends 54 will be adjacent the bottom hold of the ship 16 so as to pump the "cleaned" or separated water. The pump outlet 56, of each is fitted with a flap gate valve 58. The ship's bulwark has suitable fittings and ports for permitting discharge of the pumped fluid from the gate valve back to the ocean. Each of the pumps 52 is also operated by a drive unit 42 and is connected thereto by suitable hydraulic lines 40, 40'. Accordingly, large quantities of clean processed water are returned through the gate valve to the body of water 14 while the separated oil 12 is retained in the reservoir 44 for subsequent removal from the ship 16. With the above noted system 10 operating, up to 250,000 gpm can be pumped into and out of the ship 16 with the four pumps operating simultaneously at maximum capacity. The present invention embraces within its scope the use of variable volume pumps having capacities exceeding those noted above for the pumps 36 and 52. Consequently, the configuration of the ship should be such as to be long enough to allow oil/water separation time through the length, and hold several million pounds of the oil/water mixture at any given time.

Other submersible type pumps (not shown) comparably driven, such as the type noted above are operable to pump the separated oil from the reservoir 44 through suitable fittings (not shown) to tender vessels or to shore facilities. These pumps can operate independently or simultaneously with the pumps.

Preferably provided at the bow of the ship 16 is a control cabin 60. The control cabin 60 is provided with a control unit (not shown) wherein an operator can adjust the horizontal and vertical positioning of the collecting assembly 20 by operating the winches as necessary and bow thruster 18 to laterally position the ship 16; and operate the speed of pumps to vary their outputs. It is clear that the collecting assembly 20 could be raised should it be desired to have the ship proceed to another location at a fast rate of speed. Additionally, the invention contemplates having a plurality of tender ships with suitable equipment which can off-load the collected oil being discharged by the pumps.

Reference is made to FIG. 2 for showing an improved self-propelled contaminant current containing and sweeping vessel 70 which is used in conjunction with the recovery ship 16.

The smaller contaminant current containing and sweeping vessels 70 are, preferably, used in conjunction with a string of known buoyant booms B or netting to corral and contain the spill 12 as well as for making or producing a containment current that is useful for creating a sweeping flow of the water/oil mixture toward the collecting assembly 20 of the ship 16. Preferably, the current making and sweeping vessels 70 are high speed vessels which can travel at speeds of 40-50 knots per hour or more and which can be carried by and off-loaded from the main ship 16. For providing the containment currents of the oil/water mixture, each vessel 70 is provided with a pair of submersible pumping systems 72. Each system 72 contains a submersible pump 74, such as like pump 36 described above. As noted earlier, this type of submersible pump is obtainable from the M&W Pump Corporation and is known as M&W Model HAC-3600. This particular model can pump upto 125,000 gpm. Of course, the invention contemplates even larger capacities. The pump 74 is mounted in a conduit 76 having an elbow shape with an intake end 78 that is submersible in the water 14, and an outlet end 80 through which the pumped oil/water mixture exits, as indicated by the arrows, with sufficient force as to drive the exiting current to the collecting assembly 20. It is envisioned that the pump capacity of each pump 74 can range up to 125,000 gpm or more.

Figure 5:
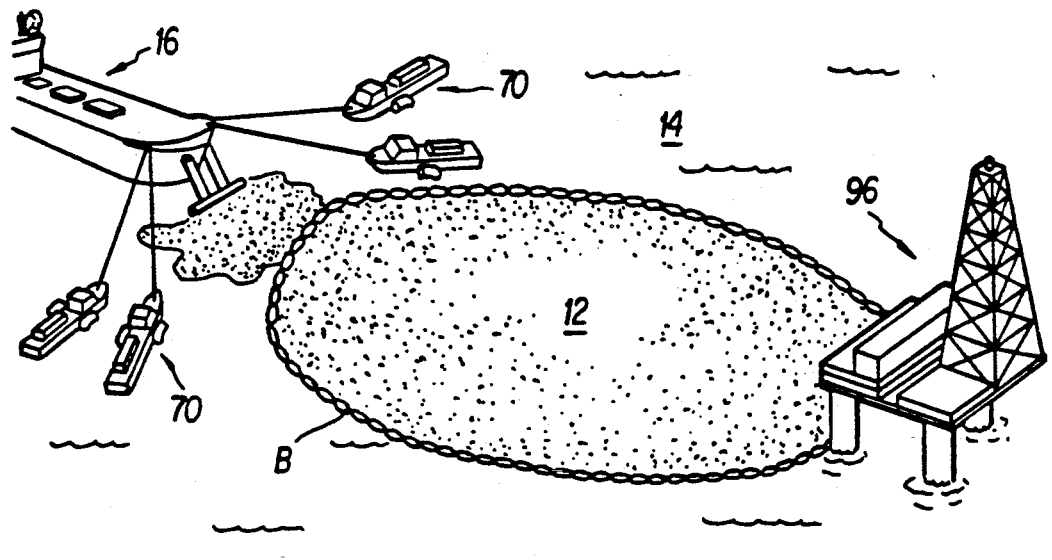
FIG. 5 is a perspective view illustrating another step of a spill recovery operation of the present invention.

Each of the pumping systems 72 further include a mounting structure 82, whereby the conduits 76 can be pivotally raised and lowered between the operative positions shown in FIG. 2 and the inoperative positions shown in FIG. 1. In this embodiment, the mounting structure 82 includes a pivotal truss arrangement 84 which is movable, by appropriate means (not shown), to a horizontal position, whereby the inlet end 78 is submerged below the waterline sufficiently to allow the submersible pump 74 to operate in the manner intended. When the truss assembly 84 is raised to a vertical position (not shown) the pumping conduit 76 is raised from the water and retracted away to the vessels' sides for storage; such as shown in FIG. 1. While the foregoing mounting structure 82 is illustrated, it is well within the spirit and scope of the present invention to have other suitable devices which can be used to raise and lower the pumping system 72 between its operative and inoperative positions. While a pair of submersible pumping systems 72 are shown it will be appreciated that a single pumping arrangement can be utilized as well. It will be appreciated that an operator in the cabin 86 of the vessel 70 can operate the submersible pumping systems 72 to achieve the desired results. Also, attached to the vessel is a pair of bow and stern winches 88a and 88b, respectively shown in FIG. 2. The winch 88a can be used for operating a cable having a heavy duty grappling hook that secures the vessel 70 to the main ship 16; such as shown in FIGS. 3-5. The stern winches 88b, which are larger, can be used for purposes of laying and pulling ends of a string of floatable booms B or net or screening in the ocean, whereby the booms B can be maneuvered in such a manner as to collect and contain the oil spill 12.

The contaminant current vessels 70 are provided with a storage area 90, for example, 40 feet in length, and which can hold the required amount of netting or booms and buoys for the containment and sweeping processes.

In addition, the present invention contemplates the utilization of an aircraft, such as a helicopter 92, which is associated with the main ship 16. The helicopter 92 can utilize a electronics scanning type detecting device (not shown) which is known in this field for purposes of detecting the thickest part of a oil slick. With such useful information, the containment current making and sweeping vessels 70 can be deployed to areas of an oil slick which are the thickest.

Reference is now made to FIGS. 3-9 for describing a preferred mode of cleaning an oil spill. As shown in FIG. 3, a hypothetical worse case scenario is depicted in which an oil tanker 94 hits an oil production platform 96 and an oil spill 12 starts contaminating the surrounding water 14. It is contemplated by the present invention that the main ship 16 and the current making and sweeping vessels 70 proceed toward the spill. It is envisioned that the current making and sweeping vessels 70 can rush to the spill at speeds, for example, of 40-50 knots. As shown in FIG. 4, two of the current making and sweeping vessels 70 can secure and position the retaining booms B about the spill 12. Another pair of containment current making producing vessels 70 are connected by tie-back cables 98 to the main vessel 16. The submersible pumping system 72 can operate to produce or make containment currents, with their pumps operating, so as to push or sweep the oil/water mixture towards the collecting assembly 20 or towards the oil spill area having the highest concentration of the oil. These high oil concentration areas are determined by the helicopter 92 relying on its electronic scanning device.

Figure 6:
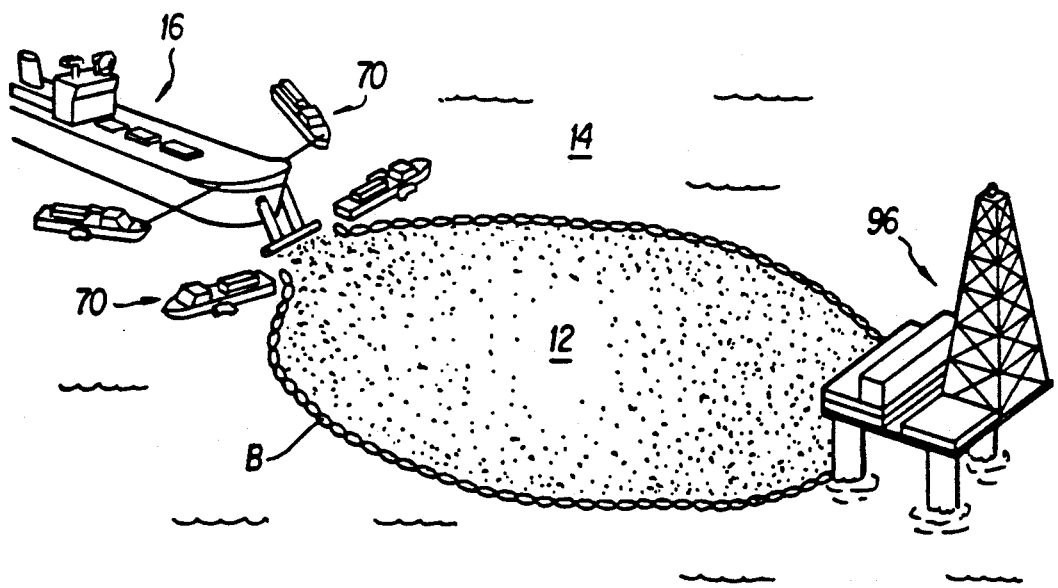
FIG. 6 is a perspective view illustrating still another step of a spill recovery operation of the present invention.
Figure 7:
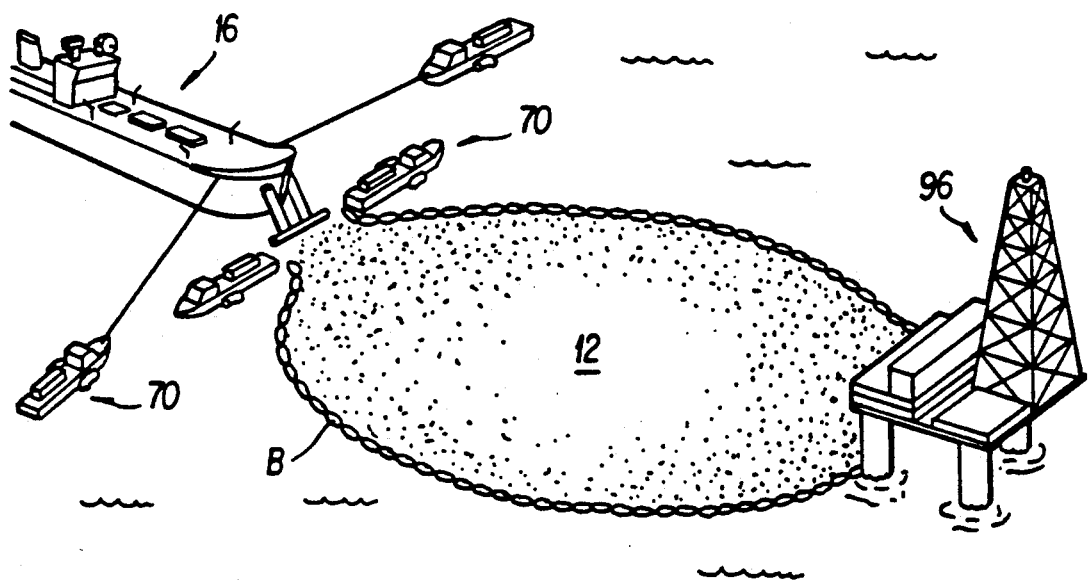
FIG. 7 is a perspective view illustrating still another step of the present invention.
Figure 8:
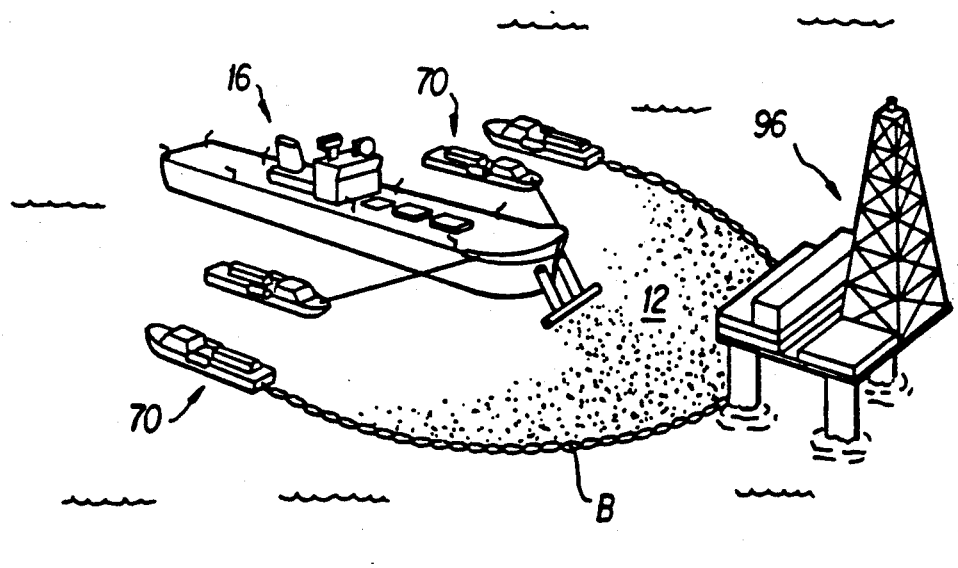
FIGS. 8 and 9 illustrate still further steps in an oil spill recovery operation of the present invention.
Figure 9:
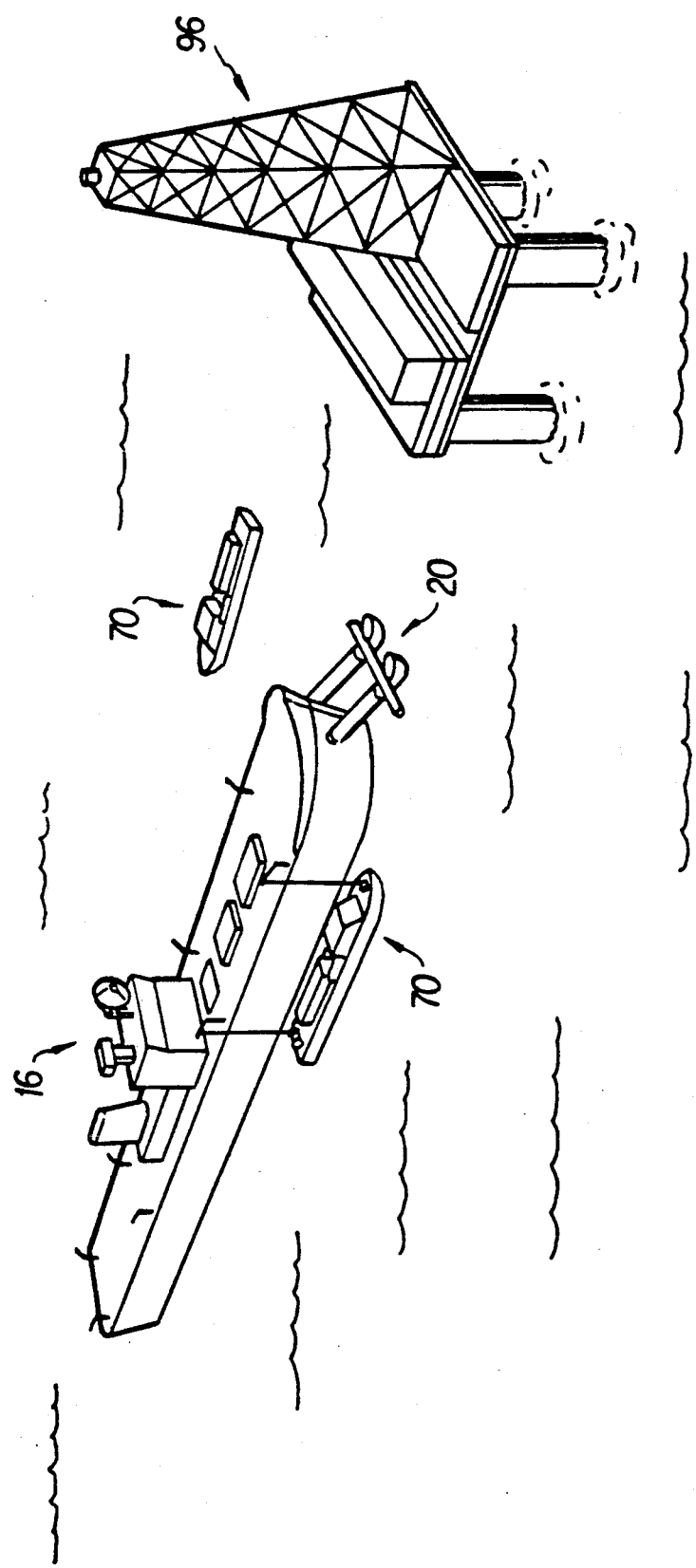

FIG. 5 shows that the booms B surround the oil spill 12 after being appropriately tied off and supported by appropriate buoys (not shown). Thereafter, the other current making and sweeping vessels 70 are utilized with their pumps operating so as to direct the containment current toward the collecting assembly 20 so that a greater percentage of the oil spill can be effectively skimmed. As shown in FIG. 6, once the residual oil surrounding the containment area has been effectively reduced, a pair of the current making and sweeping vessels 70 start pulling the booms apart while the remaining two current generating or making and sweeping vessels continue to position themselves alongside the main ship 16 to pump any excess oil back towards the collecting assembly 20. Once the containment booms are pulled apart, the main ship 16 with the skimmers enter the main area of the contained oil spill 12. It will be understood that as the booms B are being pulled apart further by two vessels 70, the remaining vessels 70 pump excess oil towards the collecting assembly 20. FIG. 8 illustrates that two of the current making and sweeping vessels 70 still effectively contain the oil spill while the main ship nearly completes the clean-up operation. FIG. 9 depicts the vessels 70 being loaded aboard the main ship 16. It is also contemplated by the present invention that the current vessels 70 can proceed to leave a clean net (not shown) at the site for purposes of catching any small portions of oil which may subsequently leak.

Figure 10:
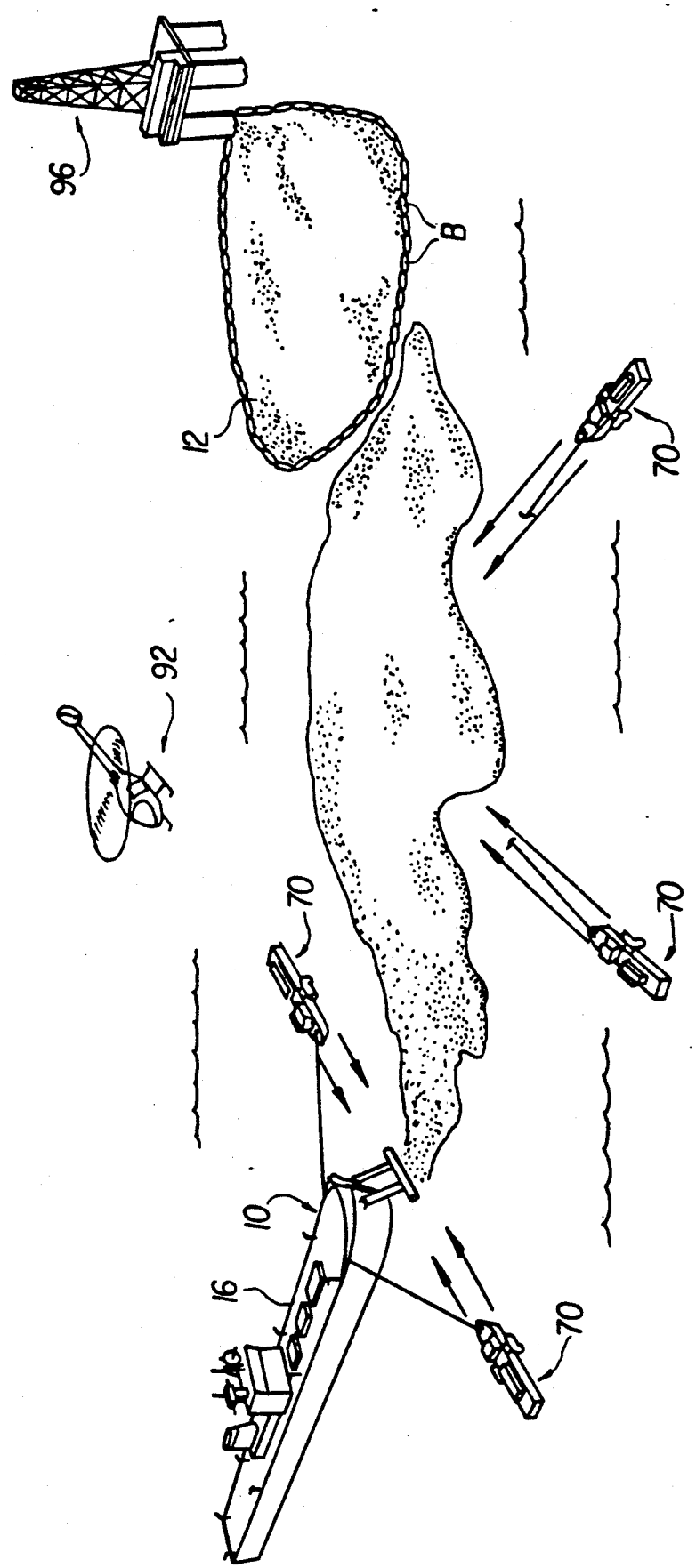
FIG. 10 is a view illustrating another embodiment of the present invention.

FIG. 10 shows another preferred embodiment of the present invention in which a plurality of current making and sweeping vessels 70 are utilized to sweep or push the oil away from the shoreline and towards the main vessel 16. In this embodiment, an anchor (not shown) is dropped and tie back cables 98 are connected thereto for securing the vessels 70. The vessels 70 can maneuver about the water and sweep or push the leading front of a spill away from the shoreline. It is contemplated that the vessels 70 could have their engines operated with sufficient thrust to offset the reverse thrust provided by the pumping systems. These engines can provide relatively high speed (e.g. above 20 knots) movement.

It will be appreciated that the foregoing procedure is an economical and highly efficient approach for containing and recovering substantial portions of oil in an oil spill. Although this embodiment discloses the procedure in conjunction with an oil production platform, it will be appreciated that the same procedure can be used with leaking ocean vessels.

Figure 11:
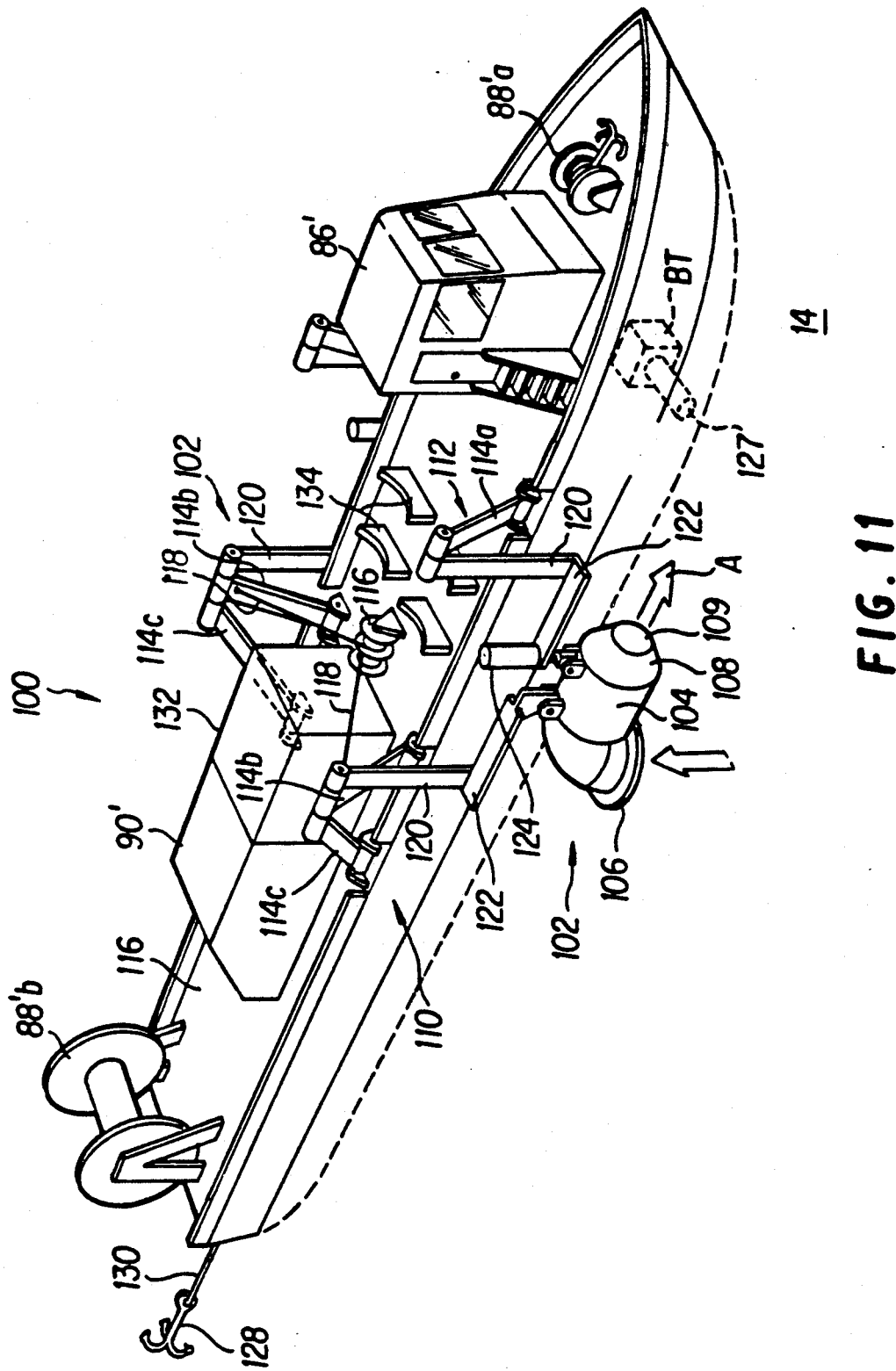
FIG. 11 is a view illustrating another preferred embodiment of a vessel of the present invention in one mode of operation.
Figure 12:
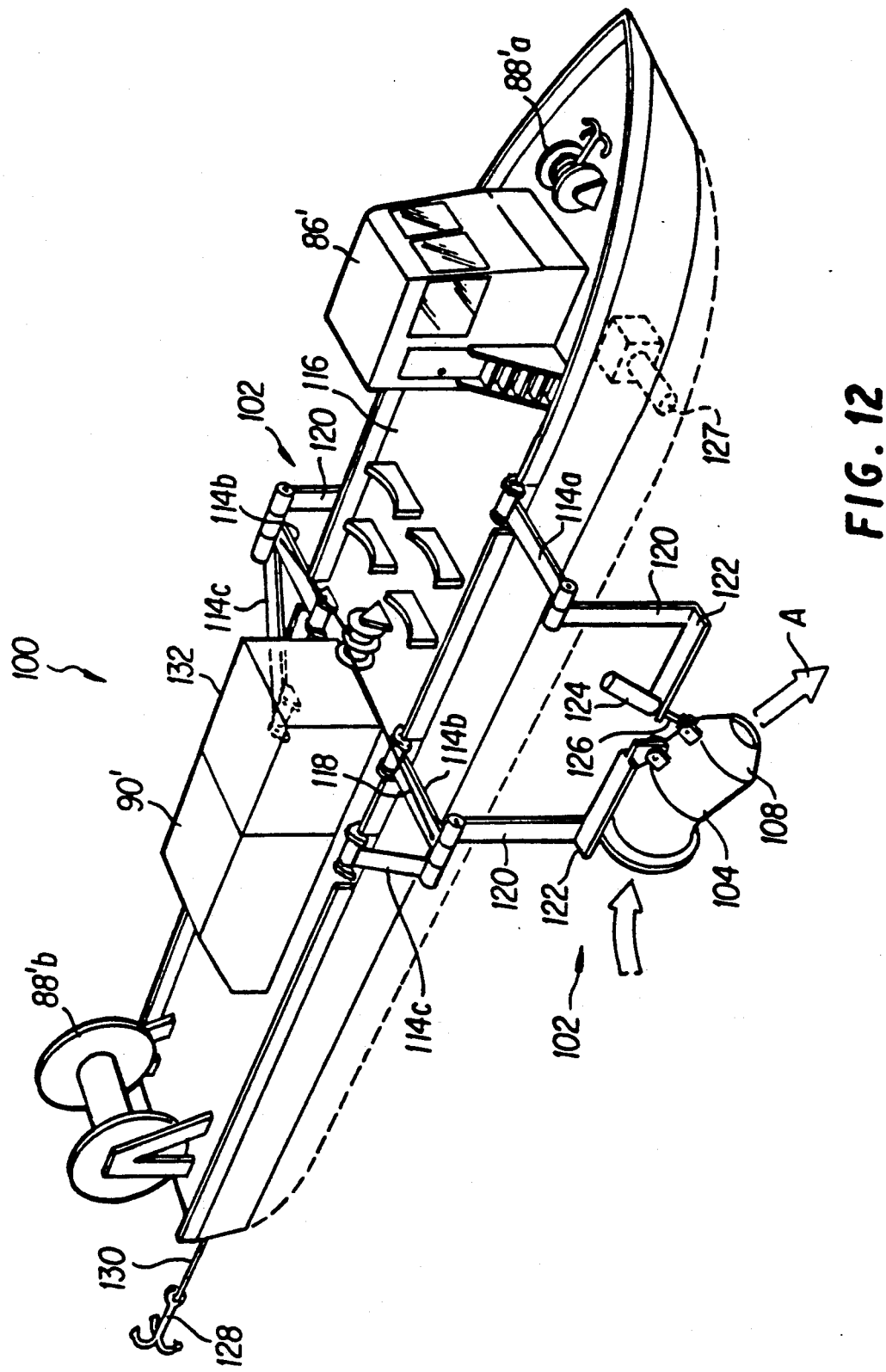
FIG. 12 is a view illustrating the embodiment of FIG. 11 but in another mode of operation.

Reference is made to FIGS. 11 and 12 for illustrating another preferred embodiment of the present invention. A surface vessel 100 is provided which includes a pair of pumping systems 102, only one of which is completely shown, that is operable in a variety of modes for generating water currents or streams for displacing surface contaminants, such as oil and other debris or for displacing stones, sand, gravel and other debris or substances located in or at the bottom of a water channel so as to clear the latter. The vessel 100 is a current generating and sweeping vessel similar to those described above for producing a contaminant current that is useful for forcing a surface flow of a water/oil mixture in a preferred direction, such as towards a collecting assembly of the main ship 16. Preferably, the current making and sweeping vessel 100 is a high speed vessel which can travel at speeds of 40-50 knots per hour or more and which can be carried by and off-loaded from the main ship 16. Each pumping system 102 contains a submersible pump 104, such as the type noted earlier and is obtainable from the M&W Pump Corporation and is known as M&W Model HAC-3600. This particular model can pump upto 125,000 gpm. Of course, the invention contemplates lower and even larger pumping capacities. The pump 104 includes an intake end assembly 106 that is submersible in the water 14, and an outlet end assembly 108 through which the pumped oil/water mixture exits, as indicated by the arrow A, with sufficient force to drive surface oil or other objects and contaminants to, for instance, the collecting assembly of the main ship. The opening 109 of the outlet end assembly 108 can be fully or partially submersible. The invention even envisions that the opening 109 can be raised above the water line.

Each of the pumping systems 102 further include a mounting structure 110, whereby the pump 104 can be raised and lowered between the operative positions shown in FIG. 11 and the positions shown in FIG. 12. There is another position which is not shown, wherein the pump 104 is raised from the water 14. In the illustrated embodiment, however, the mounting structure or assembly 110 includes a pivotal pump mounting arrangement 112 which is movable to a generally horizontal position, (FIG. 11), whereby the inlet end 106 is submerged below the waterline sufficiently to allow the submersible pump 104 to operate in the manner intended. When the mounting arrangement 112 is raised in this horizontal position, the pump outlet 108 is also positioned in a generally horizontal position to generate sufficient current to displace oil and other surface objects and substances. It is within the spirit and scope of the present invention to have other suitable devices which can be used to raise and lower the pumping system 102. The pivotal mounting arrangement 112 for each pump 104 includes pivotal arms 114 a-c which are pivotally mounted on and movable relative to the vessel body 116 under the influence of a suitable winch and cable assembly 118. Pump support arm portions 120 are pivotally connected to the pivotal arms 114 a, b. The pump support arm portions 120 have inwardly facing lateral segments 122 connected to the housing of the pump 104. An electric or hydraulic motor 124 is mounted on one segment 122 and has a movable end rod 126 that raises and lowers the pump 104 which is pivotally connected to an opposite segment 122 and thereby angularly orients the outlet end 108 and its opening 109 between the horizontal orientation of FIG. 11 and the angular orientation of FIG. 12. The present invention contemplates that the angle of the outlet end 108 can be varied from about 0° to 90° or even more depending upon the application and mounting structure employed. When the outlet end 108 is directed downwardly it directs the current generated by the pump downwardly so as to displace, by the pumping force, displaceable objects and substances in the water, for instance, stones, gravel and other debris or sedimentation.

The vessel 100 includes a bow thruster similar to that described above in connection with the previous embodiment, or U.S. Pat. No. 4,208,978, so that the bow of the vessel and thereby the direction of the pumping can be varied so as to sweep the surface oil or other materials and substances in the water. In this regard, the bow thruster would expel pumped water from either one of two outlet ports 127.

Also attached to the vessel is a pair of bow and stern winches 88'a and 88'b. The winch 88'a can be used for operating a tie-back cable or the like having a heavy duty grappling hook that secures the vessel 100 to the main ship 16; such as shown in FIGS. 3-5. The stern winch 88'b, is larger and can be used for purposes of laying and pulling ends of a string of floatable booms or net or screening in the ocean, whereby the booms can be maneuvered in such a manner as to collect and contain an oil spill as described above. A grappling hook 128 can be connected to a tie-back cable 130 (one on each side of the vessel) which is connected to inboard winches (not shown) and used by the vessel 100 to assist in securing the vessel in desired locations.

The contaminant current vessels 100 are each provided with a storage area 90' which can hold the required amount of netting or booms and buoys for the current making and sweeping processes.

The vessel 100 also includes suitable power sources 132 of diesel and hydraulic power for operating the vessel and pumps and motors. Also, the vessel 100 can include cradles 134 on deck for mounting the pumps 104 whenever the latter are swung onto the deck by operation of the winch and cable assemblies 118.

Figure 13:
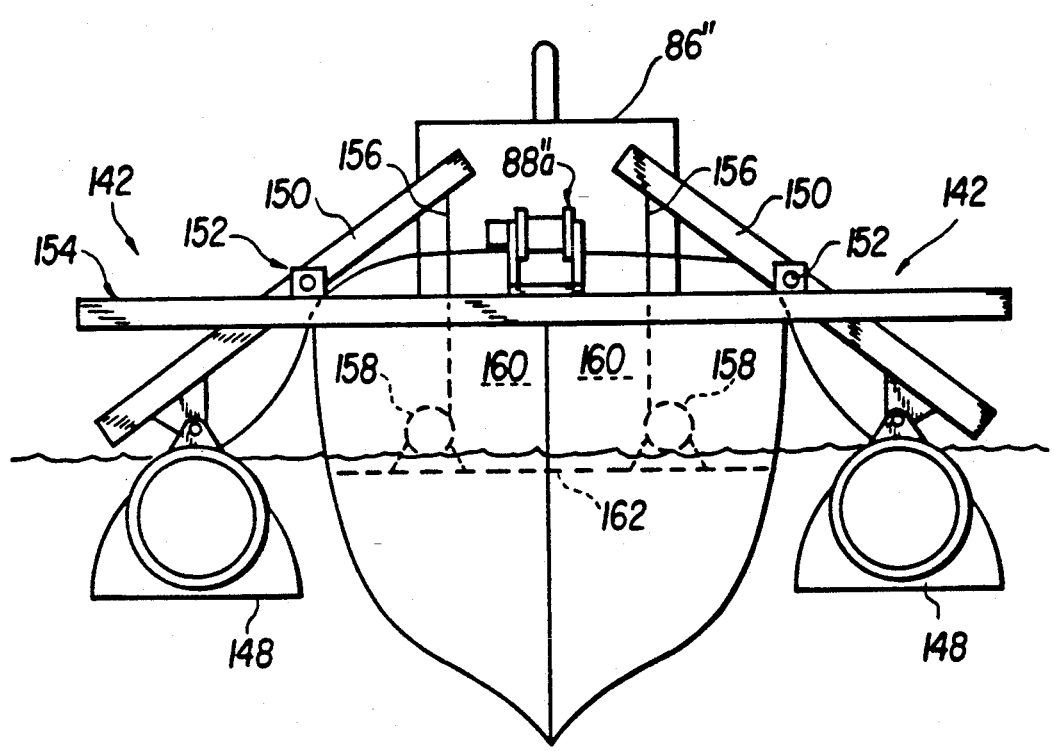
FIG. 13 is a schematic front end view of still another embodiment of a vessel made according to the present invention; and, FIG. 14 is a planar view of the vessel depicted in FIG. 13.
Figure 14:
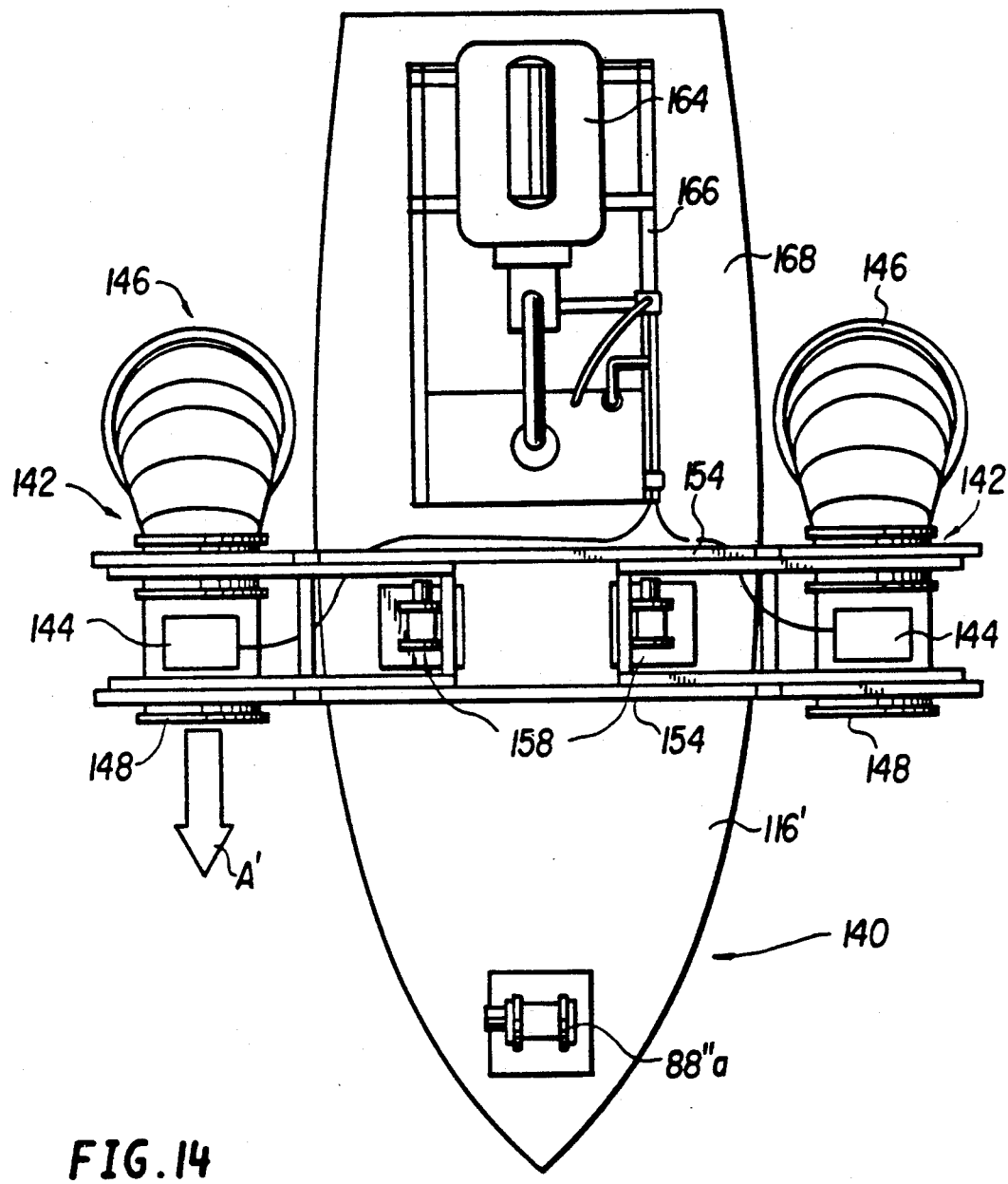

FIG. 13 represents another embodiment of a containment and sweeper vessel or boat 140. The vessel 140 is similar in structure and function to the preceding vessel except that a pair of pumping systems 142 are mounted so as to pivot upwardly between an inoperative position (not shown) and the depicted lowered position wherein submersible pumps 144 with pump inlet and outlet openings 146, 148 are submerged. In this embodiment, the current angle is not angularly adjustable. The pumps 144 are mounted on swingable arms 150 and pivot about pivot axis 152 formed by a horizontal platform 154 extending across the vessel 140. One end of each pivotal arm 150 is connected to a 156 cable attached to a winch 158. In this particular embodiment, the winch 158 is located in a well 160 formed in the vessel bulkhead 162. The winch 158 is operable to pivotally raise or lower the pump system above or below the waterline. Referring back to the pump 144, the submersible inlet end 106 which is defined as an enlarged funnel type housing. The outlet 148 can also be submerged. The pump 144 is operable to direct a current of water along the surface of the water as described in the previous embodiments for displacing an oil/water mixture in preferred directions. Since the outlet end 148 is not pivotally mounted in the direction of the current is not angularly adjusted. The vessel 140 is powered by a suitable diesel power source 164 and there is provided a suitable hydraulic drive unit 166 with the attendant flexible hydraulic oil lines 168, some of which are shown. Of course, the previous embodiments are supplied with the requisite hydraulic drive units and hydraulic oil lines.

According to the present invention it will be recognized that certain changes may be made in the above-described system, apparatus and method without departing from the scope of the present invention herein involved. It is intended that all matter contained in this description and shown in the accompanying drawings shall be interpreted as illustrative and not in any limiting sense.

What is claimed is:

1. A method of displacing substances and objects on and in water comprising the steps of:
   providing at least one propellable surface vessel having at least one pumping means connected thereto, the pumping mean shaving an inlet and an outlet means, the inlet means is submersible and the outlet means is positionable to an orientation adjacent the water level and orientations below the water;
   operating the pumping means to generate at least a substance and object displacing current flow with sufficient force so as to displace substances and objects on the water away from the vessel for contaminant control thereof, and in the water in at least a desired direction away from the vessel depending on the position of the outlet means.

2. The method of claim 1 comprising the step of angularly adjusting the orientation of the displacing current from the outlet means from a generally horizontal condition adjacent the water level for displacing surface objects and substances to an angular orientation which places the outlet means at angular orientation in the water and displaces surface objects and substances in the water.

3. The method of claim 2 comprising the step of applying selective lateral thrusts to the vessel so as to have the latter laterally sweep the water and thereby sweepingly displace the outlet means and the objects and substances displaced by the displacing current.

4. The method of claim 1 comprising the step of applying selective lateral thrusts to the vessel so as to have the latter laterally sweep the water and thereby sweepingly displace the outlet means and thereby the objects and substances displaced by the displacing current.

5. The method of claim 4 further comprising the steps of anchoring the vessel so as to facilitate the sweeping action provided by the lateral thrusts.

6. The method of claim 1 wherein the pumping means pumps up to a 125,000 gpm to generate the sufficient force for moving the objects and substances on and in the water.

7. Apparatus for displacing substances and objects on and in water comprising:
   a propellable surface vessel having at least one pumping means connected thereto;
   said pumping means having an inlet and outlet means, said inlet means being submersible and said outlet means being angularly positioned adjacent the water level and below the water, said pumping means being operable for generating at least a substances and object displacing current flow with sufficient force so as to displace substances and objects at least on or in the water away from the vessel in at least a desired direction away from the vessel depending on the angular position of said outlet means.

8. The apparatus of claim 7 further comprising means for supporting said pumping means and means for angularly adjusting the orientation of the displacing current from said outlet means from a generally horizontal condition so as to displace surface objects and substances to an angular orientation which displaces objects and substances in the water.

9. The apparatus of claim 8 further comprising means operable for applying selective lateral thrusts to said vessel so as to have the latter laterally sweep the current and thereby sweepingly displace said outlet means and thereby the objects and substances displaced by the displacing current.

10. The apparatus of claim 9 further including anchoring means for anchoring said vessel in a predetermined location so as to facilitate the sweeping action of said vessel.

11. The apparatus of claim 10 wherein said anchoring means includes at least a cable and a grappling hook.

12. The apparatus of claim 8 wherein said adjusting means includes a motor means coupled to one end of said pumping means and means for pivotally coupling another end of said pumping means to said vessel, said motor means being operable to pivot said pumping means upwardly or downwardly so that an outlet of said pumping means according directs the current upwardly or downwardly.

13. The apparatus of claim 7 further comprising means for supporting said pumping means for movement into and out of the water and means operable for moving said supporting means so that said pumping means can move into and out of the water.

14. The apparatus of claim 13 wherein said supporting means and moving means are operable for moving said pumping means on said vessel.

15. The apparatus of claim 14 wherein said moving means is pivotally mounted on said supporting means and is operable so as to pivot said pumping means into and out of the water.

16. The apparatus of claim 7 wherein said pumping means pumps up to 125,000 gpm to generate the sufficient force for moving the objects and substances on and in the water.

17. Apparatus for displacing substances and objects in water, comprising:
a propellable surface vessel having at least one pumping means connected thereto;
said pumping means having an inlet and outlet means, said inlet means being submersible and said outlet means being angularly positioned below the water, said pumping means being operable for generating at least a substances and object displacing current flow with sufficient force so as to displace substances and objects in the water away from said vessel in at least a desired direction depending on the angular position of said outlet means.

* * * * *